(12) United States Patent
Romelfanger et al.

(10) Patent No.: US 11,780,355 B1
(45) Date of Patent: Oct. 10, 2023

(54) ADDITIVE MANUFACTURED CUSHIONED COMPONENT

(71) Applicant: Ford Global Technologies, LLC, Dearborn, MI (US)

(72) Inventors: Megan Romelfanger, Grosse Pointe Woods, MI (US); Patrick Maloney, Livonia, MI (US); Brian Boland, Pinckney, MI (US); Alex Perkins, Detroit, MI (US); Victoria Leigh Schein, Dearborn, MI (US); Marcos Silva Kondrad, Macomb Township, MI (US); Sangram Tamhankar, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/890,515

(22) Filed: Aug. 18, 2022

(51) Int. Cl.
| | |
|---|---|
| *B60N 2/60* | (2006.01) |
| *B60N 2/66* | (2006.01) |
| *A47C 4/54* | (2006.01) |
| *A47C 7/46* | (2006.01) |
| *B60N 2/90* | (2018.01) |

(52) U.S. Cl.
CPC ............... *B60N 2/665* (2015.04); *A47C 4/54* (2013.01); *A47C 7/467* (2013.01); *B60N 2/914* (2018.02)

(58) Field of Classification Search
CPC ........... A47C 7/142; A47C 7/467; A47C 4/54; B60N 2/665; B60N 2/914
See application file for complete search history.

(56) References Cited

U.S. PATENT DOCUMENTS

| | | |
|---|---|---|
| 4,924,162 A | 5/1990 | Sakamoto et al. |
| 5,130,622 A | 7/1992 | Takizawa et al. |
| 5,433,506 A * | 7/1995 | Jensen ..................... A47C 4/54 |
| | | 297/DIG. 8 |
| 5,658,050 A | 8/1997 | Lorbiecki |
| 5,707,109 A | 1/1998 | Massara et al. |
| 5,975,629 A | 11/1999 | Lorbiecki |
| 6,037,731 A | 3/2000 | Fruehauf et al. |
| 6,122,568 A | 9/2000 | Madau et al. |

(Continued)

FOREIGN PATENT DOCUMENTS

EP 2441338 B1 6/2017

*Primary Examiner* — Syed A Islam
(74) *Attorney, Agent, or Firm* — Vichit Chea; Price Heneveld LLP

(57) ABSTRACT

A seat assembly includes a cushioned component having a lattice matrix. An air bladder assembly is covered by the lattice matrix. The air bladder assembly includes a plurality of air bladders supported on a platform assembly. Each air bladder includes a body portion operable between deflated and inflated conditions. Each air bladder includes a connection stem. A support plate includes a plurality of access apertures disposed therethrough. The air bladder assembly is operably coupled to the support plate. Each air bladder is aligned with at least one access aperture of the plurality of access apertures. A carrier assembly includes a plurality of mounting apertures disposed through an outer surface thereof. The carrier assembly receives the connection stem of each air bladder through at least one mounting aperture of the plurality of mounting apertures. Each air bladder may include a release valve for releasing air therethrough.

19 Claims, 5 Drawing Sheets

(56) References Cited

U.S. PATENT DOCUMENTS

| | | |
|---|---|---|
| 6,629,715 B2 | 10/2003 | Oh et al. |
| 7,125,077 B2 | 10/2006 | Frank |
| 7,717,520 B2 | 5/2010 | Boren et al. |
| 7,905,548 B2 | 3/2011 | Gupta et al. |
| 8,033,600 B2 | 10/2011 | Reynolds et al. |
| 8,746,792 B2 | 6/2014 | Ruthinowski et al. |
| 9,211,824 B2 | 12/2015 | Arant et al. |
| 9,333,889 B1* | 5/2016 | Cloutier ................ B60N 2/70 |
| 9,499,072 B2 | 11/2016 | Yetukuri et al. |
| 9,661,928 B2 | 5/2017 | Patrick et al. |
| 9,738,186 B2 | 8/2017 | Krueger et al. |
| 9,937,826 B2 | 4/2018 | Dry |
| 10,137,802 B2 | 11/2018 | Cuddihy et al. |
| 10,343,565 B2 | 7/2019 | Baek et al. |
| 10,464,455 B2 | 11/2019 | Boccuccia et al. |
| 10,464,456 B2 | 11/2019 | Boccuccia et al. |
| 10,549,664 B2* | 2/2020 | Fujikake ................ B60N 2/90 |
| 10,589,671 B1* | 3/2020 | Ali ........................ B60N 2/976 |
| 11,364,828 B2* | 6/2022 | Maloney ............... B60N 2/665 |
| 2010/0207443 A1 | 8/2010 | Brncick |
| 2018/0361897 A1* | 12/2018 | Lem ...................... B60N 2/976 |
| 2021/0237634 A1* | 8/2021 | Maloney ............... A47C 7/467 |

* cited by examiner

ADDITIVE MANUFACTURED CUSHIONED COMPONENT

FIELD OF THE DISCLOSURE

The present disclosure generally relates to a seating assembly, and more particularly, to a seat assembly having cushioned components with cushioning materials that include integrated air bladder assemblies.

BACKGROUND OF THE DISCLOSURE

The tunable inflation profile has a flatter profile that is possible without added thickness from bladder plastic. Personalization via inflation level accommodates for differences in body type. Bladders can be included in all areas of the seat, accommodating for maximum personalization. The bladder and bolster assembly are 3D printed in a single step, rather than multiple steps.

SUMMARY OF THE DISCLOSURE

According to a first aspect of the present disclosure, a seating assembly includes a cushioned component having a lattice matrix. An air bladder assembly is covered by the lattice matrix, and the air bladder assembly includes a plurality of air bladders supported on a platform assembly. Each air bladder of the plurality of air bladders includes a body portion positioned on an outer surface of the platform assembly and are operable between deflated and inflated conditions. Each air bladder of the plurality of air bladders also include a connection stem outwardly extending from an inner surface of the platform assembly. A support plate includes a plurality of access apertures disposed therethrough. The air bladder assembly is operably coupled to the support plate, such that each air bladder of the plurality of air bladders is aligned with at least one access aperture of the plurality of access apertures. A carrier assembly has a mounting aperture disposed through an outer surface thereof. The connection stem is received through the mounting aperture.

Embodiments of the first aspect of the present disclosure can include any one or a combination of the following features:
 - the outer surface of the carrier assembly is a contoured surface;
 - the support plate is a flexibly resilient plate that includes a complementary configuration relative to the contoured surface of the carrier assembly;
 - the connection stem of each air bladder is received through the at least one access aperture of the plurality of access apertures of the support plate; and
 - each air bladder of the plurality of air bladders includes a non-porous outer casing surrounding an interior cavity, further wherein the outer casing and the lattice matrix are integrated components comprised of a common material to define a monolithic structure.

According to another aspect of the present disclosure, a seating assembly includes a cushioned component having a lattice matrix. An air bladder assembly is covered by the lattice matrix, and the air bladder assembly includes a plurality of air bladders supported on a platform assembly. Each air bladder of the plurality of air bladders includes a body portion positioned on an outer surface of the platform assembly and are operable between deflated and inflated conditions. At least one air bladder of the plurality of air bladders also include a connection stem outwardly extending from an inner surface of the platform assembly. Each air bladder of the plurality of air bladders includes a pressure release valve. A support plate includes a plurality of access apertures disposed therethrough. The air bladder assembly is operably coupled to the support plate, such that each air bladder of the plurality of air bladders is aligned with at least one access aperture of the plurality of access apertures. A carrier assembly has a mounting aperture disposed through an outer surface thereof. The connection stem is received through the mounting aperture.

Embodiments of the other aspect of the present disclosure can include any one or a combination of the following features:
 - the outer surface of the carrier assembly is a contoured surface;
 - the support plate is a flexibly resilient plate that includes a complementary configuration relative to the contoured surface of the carrier assembly;
 - air within at least one air bladder of the plurality of air bladders releases through the pressure release valve upon reaching a threshold pressure within the at least one air bladder of the plurality of air bladders; and
 - each air bladder of the plurality of air bladders release air through the pressure release valve until an internal pressure of the plurality of air bladders is below a threshold pressure.

According to another aspect of the present disclosure, a seat assembly includes a cushioned component having a lattice matrix. An air bladder assembly is integrated into the lattice matrix. The air bladder assembly includes first and second air bladders that are spaced-apart from one another and operable between at-rest and pressurized conditions. The first and second air bladders each include a non-porous outer casing surrounding an interior cavity. The outer casing and the lattice matrix are integrated components comprised of a common material to define a monolithic structure.

Embodiments of this aspect of the present disclosure can include any one or a combination of the following features:
 - the seat assembly also includes a support plate having an access aperture disposed therethrough, wherein the support plate is flexibly resilient, and further wherein the first and second air bladders are operably coupled to the support plate;
 - the seat assembly also includes a carrier assembly having a mounting aperture disposed through an outer surface thereof, wherein the outer surface of the carrier assembly is a contoured surface, and further wherein the support plate includes a complementary configuration relative to the contoured surface;
 - the seat assembly also includes a platform assembly having an outer surface, wherein the first and second air bladders each include a body portion positioned on the outer surface of the platform assembly;
 - the first air bladder includes a connection stem outwardly extending from an inner surface of the platform assembly;
 - the seat assembly also includes an inflation module operably coupled to the connection stem, such that the air bladder assembly is fluidically coupled to the inflation module by one or more supply lines;
 - the connection stem is received through the access aperture of the support plate; and
 - the connection stem is received through the mounting aperture of the carrier assembly.

According to another aspect of the present disclosure, a seat assembly includes a cushioned component having a lattice matrix. An air bladder assembly is integrated into the lattice matrix. The air bladder assembly includes first and second air bladders that are spaced-apart from one another and operable between at-rest and pressurized conditions. The first and second air bladders each include a non-porous outer casing surrounding an interior cavity. The outer casing and the lattice matrix are integrated components comprised of a common material to define a monolithic structure. The first and second air bladders each include a valve.

Embodiments of this aspect of the present disclosure can include any one or a combination of the following features:
- the seat assembly also includes a support plate having an access aperture disposed therethrough, wherein the support plate is flexibly resilient, and further wherein the first and second air bladders are operably coupled to the support plate;
- the seat assembly also includes a carrier assembly having a mounting aperture disposed through an outer surface thereof, wherein the outer surface of the carrier assembly is a contoured surface, and further wherein the support plate includes a complementary configuration relative to the contoured surface;
- the first air bladder includes a connection stem outwardly extending from an inner surface of the platform assembly;
- the valve of at least one of the first and second air bladders releases air from within the first and second air bladders while pressure within the first and second air bladders is more than a threshold pressure;
- the valve is operable between at least two conditions: an open condition, wherein air is released from inside the first and second air bladders, and further wherein the valve is in the open condition when a pressure level inside the first and second air bladders exceeds a predetermined pressure level threshold; and a closed condition, wherein the valve is in the closed condition when the pressure level inside the first and second air bladders is less than the predetermined pressure level threshold; and
- the first and second air bladders each include a pressure sensor, wherein the pressure sensor signals the inflation module to send air to the first and second air bladders.

According to another aspect of the present disclosure, a seat assembly includes a cushioned component having a lattice matrix and an air bladder. The air bladder has a distal portion and a proximal portion. The proximal portion includes a connection stem outwardly extending therefrom. The lattice matrix covers an outermost surface of the distal portion. The air bladder is operable between at-rest and pressurized conditions. A flexibly resilient support plate has access apertures disposed therethrough. The air bladder is operably coupled to the support plate, such that the connect stem thereof is received through the access aperture. A carrier assembly has a mounting aperture disposed through an outer surface thereof. The connection stem is received through the mounting aperture. The outer surface of the carrier assembly is a contoured surface. The support plates includes a complementary configuration relative to the contoured surface.

Embodiments of this aspect of the present disclosure can include any one or a combination of the following features:
- the air bladder includes a platform assembly, wherein the distal portion of the air bladder is positioned on an outer surface of the platform assembly, and further wherein the proximal portion is position on an inner surface of the platform assembly;
- the air bladder includes a non-porous outer casing surrounding an interior cavity;
- the outer casing and the lattice matrix are integrated components comprised of a common material to define a monolithic structure;
- the connection stem includes a snap linkage, and further wherein the snap linkage retains the air bladder, the support plate, and the carrier assembly in a position along an axial direction of the connection stem;
- the support plate is disposed between the air bladder and the carrier assembly; and
- the seat assembly includes an inflation module operably coupled to the connection stem by at least one supply line.

According to yet another aspect of the present disclosure, a seat assembly includes a cushioned component having a lattice matrix and an air bladder. The air bladder has a distal portion and a proximal portion. The proximal portion includes a connection stem outwardly extending therefrom. The air bladder includes an air release valve. The lattice matrix covers an outermost surface of the distal portion. The air bladder is operable between at-rest and pressurized conditions. A flexibly resilient support plate has access apertures disposed therethrough. The air bladder is operably coupled to the support plate, such that the connect stem thereof is received through the access aperture. A carrier assembly has a mounting aperture disposed through an outer surface thereof. The connection stem is received through the mounting aperture. The outer surface of the carrier assembly is a contoured surface. The support plates includes a complementary configuration relative to the contoured surface.

Embodiments of this aspect of the present disclosure can include any one or a combination of the following features:
- the air bladder includes a platform assembly, wherein the distal portion of the air bladder is positioned on an outer surface of the platform assembly, and further wherein the proximal portion is position on an inner surface of the platform assembly;
- the air bladder includes a non-porous outer casing surrounding an interior cavity;
- the air release releases air from within the air bladder while a pressure level within the air bladder exceeds a threshold pressure level, and further wherein the air release valve is in a closed condition when the pressure within the air bladder is less than the threshold pressure level;
- the seat assembly includes an inflation module operably coupled to the connection stem by at least one supply line;
- the support plate is disposed between the air bladder and the carrier assembly; and
- the air bladder includes a pressure sensor, wherein the pressure sensor signals the inflation module to send air to the air bladder after the air release valve releases air.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
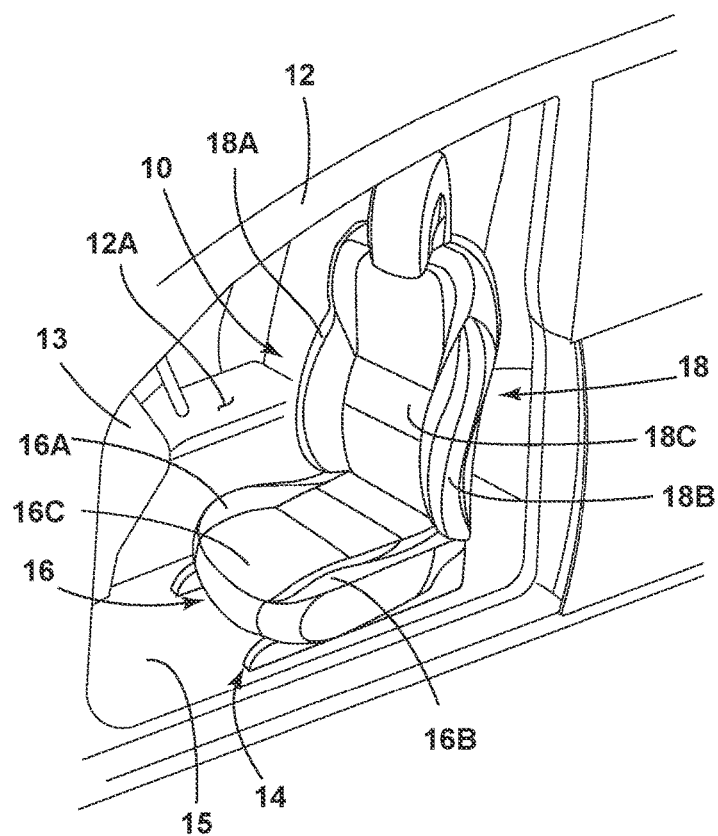
FIG. 1 is a top perspective view of a seat assembly positioned within a vehicle interior.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seat_assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIG. 1, a seat assembly 10 is shown disposed within a vehicle interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed in other seat assemblies positioned in other areas of a vehicle interior 12A, such as the passenger side seating area, a rear seating area, or a third row seating option. The seat assembly 10 is supported on a track system 14 disposed on a vehicle floor support surface 15, and generally includes a substantially horizontal seat portion 16 and a substantially upright seatback 18. It is contemplated that the seatback 18 is a pivoting member configured for pivotal movement relative to the seat portion 16 between upright and reclined positions. The seat portion 16 generally includes a central support portion 16C having protruding fins or side bolsters 16A, 16B disposed on opposite sides thereof. The side bolsters 16A, 16B are generally disposed at an inward angle directed towards the central support portion 16C. The side bolsters 16A, 16B of the seat portion 16 are configured to provide support for a vehicle occupant as seated in the seat assembly 10 when the vehicle 12 is in motion. Similarly, the seatback 18 includes side bolsters 18A, 18B and a central support portion 18C. The side bolsters 18A, 18B of the seatback 18 are generally angled towards the central support portion 18C of the seatback 18.

Figure 2:
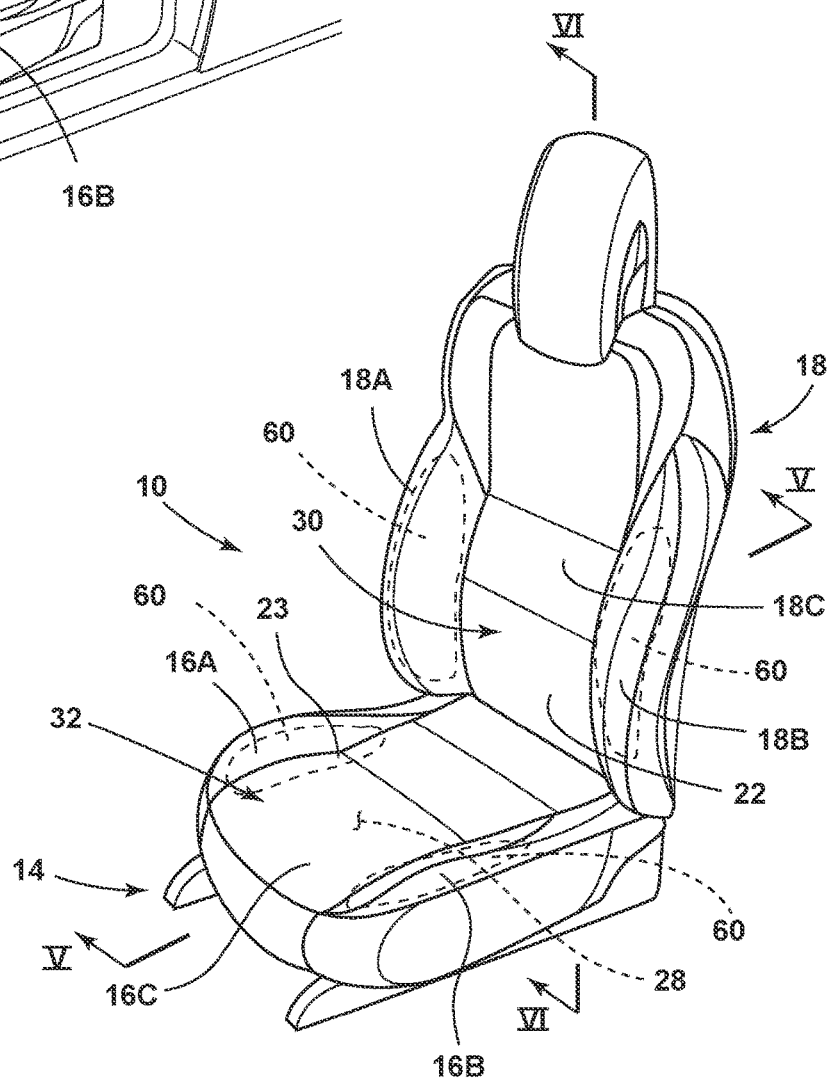
FIG. 2 is a top perspective view of the seat assembly of FIG. 1 as removed from the vehicle interior.

Referring now to FIG. 2, the various parts of the seat portion 16 and the seatback 18 are covered with seat covers 23, 22, respectively. The seat covers 23, 22 may be comprised of a suitable natural or synthetic material, such as leather, imitation leather, vinyl, clothe, or any combination thereof, that generally covers cushion materials and frame components of the seat assembly 10. The seatback 18 includes a cushioned component 30 that at least partially defines the central support portion 18C of the seatback 18. Similarly, the seat portion 16 includes a cushioned component 32 that at least partially defines the central support portion 16C of the seat portion 16. An air bladder assembly 60 is shown disposed within each of the side bolsters 16A and 16B of the seat portion 16, as well as each of the side bolsters 18A and 18B of the seatback 18. In FIG. 2, the seat cover 23 of the seat portion 16 covers and conceals an interior 28 of the seat portion 16.

Figure 3:
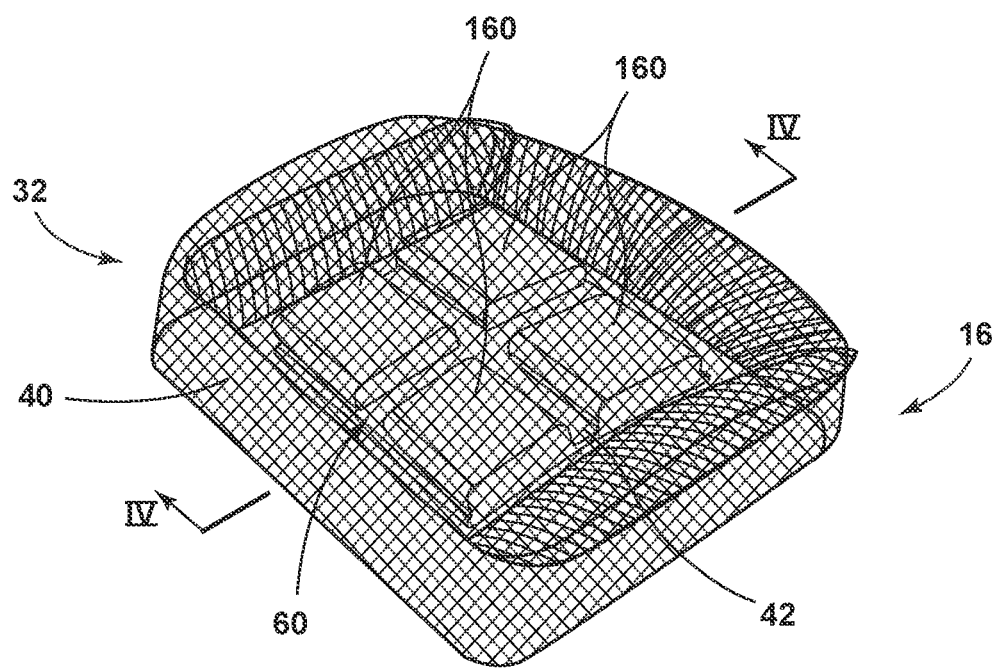
FIG. 3 is a top perspective view of a cushioned component.

Referring now to FIG. 3, the cushioned component 32 of the seat portion 16 is shown removed from the seat assembly 10 of FIG. 2. The cushioned component 32 includes a lattice matrix 40 which provides the cushioning support for a seat occupant seated in the seat assembly 10 (FIG. 2).

As used herein, the term "lattice matrix" refers to a structural pattern of interconnected links that define cells or voids therebetween, wherein the overall pattern resembles an expanded material configuration. The cushioned components discussed herein are contemplated to be comprised of a single material used in an additive manufacturing process to form the lattice matrices thereof into monolithic structures. In this way, the cushioned components of the present concept include fully integrated component parts comprised of a common material that define overall monolithic structures. As used herein, the term "integrated" refers to component parts of a unitary whole that are formed together to provide the monolithic structure of the overall article. In this way, the term "integrated" is used herein to describe component parts that are formed together is a unitary whole, as opposed to components that are separately formed and later operably coupled to one another in assembly. As used herein, the term "monolithic structure" is used to describe a structure that is integrally formed in a forming process, such as an additive manufacturing technique. Additive manufacturing techniques contemplated for use with the present concept may include 3D printing, laser sintering and other known additive manufacturing techniques. In this way, the monolithic structures of the present concept provide unitary structures comprised of multiple configurations and features. It is noted that the monolithic structures of the present concept may include of a single or common material used in the additive manufacture of the structure.

As further shown in FIG. 3, an air bladder assembly 60 is shown disposed within the lattice matrix 40. The air bladder assembly 60 is contemplated to include a plurality of air bladders 160 supported on a platform assembly 42. Each air bladder 160 is operable between deflated and inflated conditions. In this way, a seat occupant can adjust an overall comfort setting of the seat portion 16 of the seat assembly 10, as shown in FIG. 2. The air bladder assembly 60 is contemplated to be an integrated component of the lattice matrix 40, in that the air bladder assembly 60 and the lattice matrix 40 are contemplated to be comprised of a common material used in an additive manufacturing process to create a monolithic structure in the form of the cushioned component 32. As such, it is contemplated that the cushioned component 32, including the lattice matrix 40 and the air bladder assembly 60 thereof, may be created using a single additive manufacturing process, such as a 3D printing process to create a monolithic 3D printed part comprised of a common material throughout.

Figure 4:
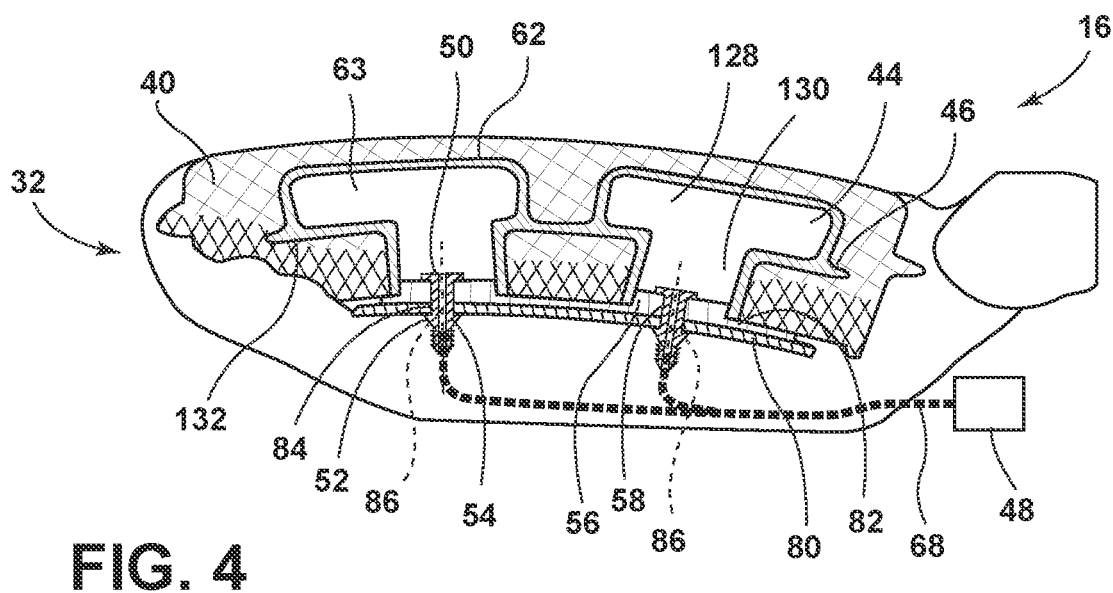
FIG. 4 is a cross-sectional view of the cushioned component of FIG. 3 taken at line IV.

As further shown in FIG. 4, the air bladder assembly 60 is shown disposed within the lattice matrix 40. Each air bladder 160 of the plurality of air bladders 160 includes a body portion 44 positioned on an outer surface 46 of the platform assembly 42. Each air bladder 160 of the plurality of air bladders 160 includes an outer casing 62. The outer casing 62 is contemplated to be an airtight, non-porous outer casing surrounding an interior cavity 63 of each air bladder 160 of the plurality of air bladders 160. As noted above, the air bladder assembly 60 is contemplated to be an integrated component of the lattice matrix 40 comprised of a common material. Specifically, the outer casing 62 is contemplated to be covered by and integrated with the lattice matrix 40, as shown in the embodiment of FIG. 4. In this way, the lattice matrix 40 fully surrounds the air bladder assembly 60. In the embodiment shown in FIG. 4, it is contemplated that each air bladder 160 of the plurality of air bladders 160 is shown in a partially inflated condition, wherein the interior cavity 63 of each air bladder 160 of the plurality of air bladders 160 contains a volume of an inflation medium provided via a supply line 68 disposed through the lattice matrix 40. It is contemplated that the plurality of air bladders 160 are operable between inflated and deflated conditions, and any partially inflated conditions therebetween, by an inflation module 48 operably coupled to the supply line 68 to provide an inflation medium to the plurality of air bladders 160. While the plurality of air bladders 160 are described herein as a plurality of "air" bladders, it is contemplated that the plurality of air bladders 160 may be filled with an inflation medium other than air, such as a fluid. It is also contemplated that the plurality of air bladders 160 may be filled with air, or other gas, using a pneumatic activation system connected to the supply line 68. Each air bladder 160 of the plurality of air bladders 160 includes a connection stem 50. The connection stem 50 is contemplated to comprise a snap linkage 52. The connection stem 50 allows for fluid communication between the air bladder assembly 60 and the supply line 68. The connection stem 50 includes a fluid path 54. The supply line 68 is coupled with the connection stem 50 of each air bladder 160 of the plurality of air bladders 160 and the inflation module 48. The inflation module 48 may be disposed within the seat assembly 10.

With further reference to FIG. 4, the seat portion 16 includes a support plate 56. The support plate 56 is contemplated to be comprised of a common material with respect to the air bladder assembly 60. The support plate 56 may be airtight, as well as non-porous. The support plate 56 is contemplated to be flexibly resilient. The support plate 56 has a plurality of access apertures 58 disposed therethrough. Access apertures 58 of the plurality of access apertures are aligned with the air bladders 160 of the plurality of air bladders 160. The connection stem 50 of an associated air bladder 160 is received through an associated access aperture 58 of the support plate 56, such that each air bladder 160 of the plurality of air bladders 160 is coupled to the support plate 56.

As further shown in FIG. 4, the seat portion 16 includes a carrier assembly 80. The carrier assembly 80 includes an outer surface 82. The outer surface 82 of the carrier assembly 80 includes a plurality of mounting apertures 84 disposed therethrough. The outer surface 82 of the carrier assembly 80 is further contemplated to be a contoured surface. It is contemplated that the support plate 56 includes a complementary configuration relative to the contoured surface of the outer surface 82 of the carrier assembly 80.

Each mounting aperture 84 of the plurality of mounting apertures 84 of the carrier assembly 80 receives an associated connection stem 50 of an associated air bladder 160 to couple to the air bladder assembly 60 and the support plate 56 with the carrier assembly 80. It is contemplated that the support plate 56 is positively captured or sandwiched between the air bladder assembly 60 and the carrier assembly 80. Each connection stem 50 includes an axis 86. While the air bladder assembly 60, the support plate 56, and the carrier assembly 80 are coupled together by multiple connection stems 50, the air bladder assembly 60, support plate 56, and carrier assembly 80 are retained in a stacked configuration along an axial direction of the connection stem 50.

Figure 5:
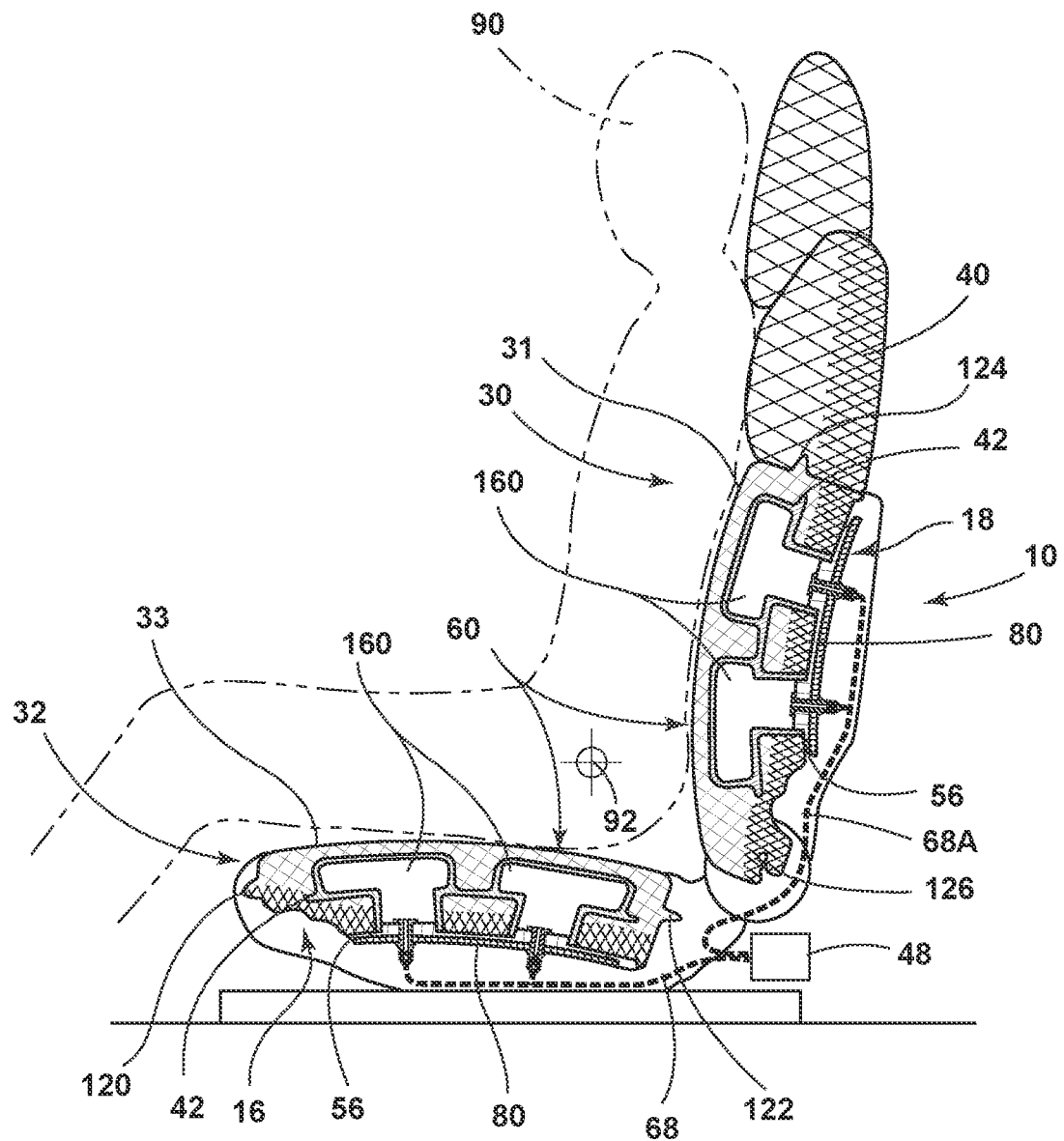
FIG. 5 is a cross-sectional view of the seat assembly of FIG. 2 taken at line V.

Referring now to FIG. 5, a seat occupant 90 is shown supported on the seat assembly 10. The vehicle hip pivot point, commonly referred to in the automotive industry as "H-point", is a specified location of the hip of the seat occupant 90, when seated in the seat assembly 10. In FIG. 5, the H-point is shown at reference numeral 92. The H-point 92 is generally defined by the Society of Automotive Engineers (SAE) as a mechanically hinged hip point of a three-dimensional manikin (SAE 12826 manikin), which simulates the actual pivot center of a human hip. As noted above, the air bladders 160, 160 are contemplated to be operable between inflated or pressurized conditions and deflated or depressurized conditions without affecting the H-point setting. In FIG. 5, the H-point 92 of the seat occupant 90 is aligned with an H-point of the seat assembly 10, such that H-point 92 identifies the H-point for both the seat occupant 90 and the seat assembly 10. This alignment is aided and maintained by the integration of the air bladders 160, 160 into the respective cushioned components 32, 30, as opposed to a plurality of components stacked-up on one another.

As further shown in FIG. 5, the seat assembly 10 also includes the flexible non porous air bladder assembly 60 disposed within the cushioned component 30 of the seatback 18. The air bladder assembly 60 of the seatback 18 is also contemplated to be integrated with the cushioned component 30 of the seatback 18 using an additive manufacturing technique. As such, it is contemplated that the cushioned component 30 of the seat back 18 includes a lattice matrix 40 which provides the cushioning support for a seat occupant 90 seated in the seat assembly 10. The air bladder assembly 60, as shown in the seatback 18 in FIG. 5, is completely surrounded by the lattice matrix 40. A contact surface 33 of the seat portion 16 that is intended to contact the occupant 90 does not deform or otherwise change a topography of the seat portion 16 due to the air bladder assembly 60 inflating and deflating. A contact surface 31 of the seatback 18 that is intended to contact the occupant 90 does not deform or otherwise change a topography of the seatback 18 due to the air bladder assembly 60 inflating and deflating. In other words, a total volume of the seating assembly 10 remains constant between at-rest and pressurized conditions of the air bladder assemblies 60. A supply line 68A is shown coupled to the air bladders 160 of the air bladder assembly 60 within the seatback 18 for supplying an inflation medium to the air bladder assembly 60.

Figure 6:
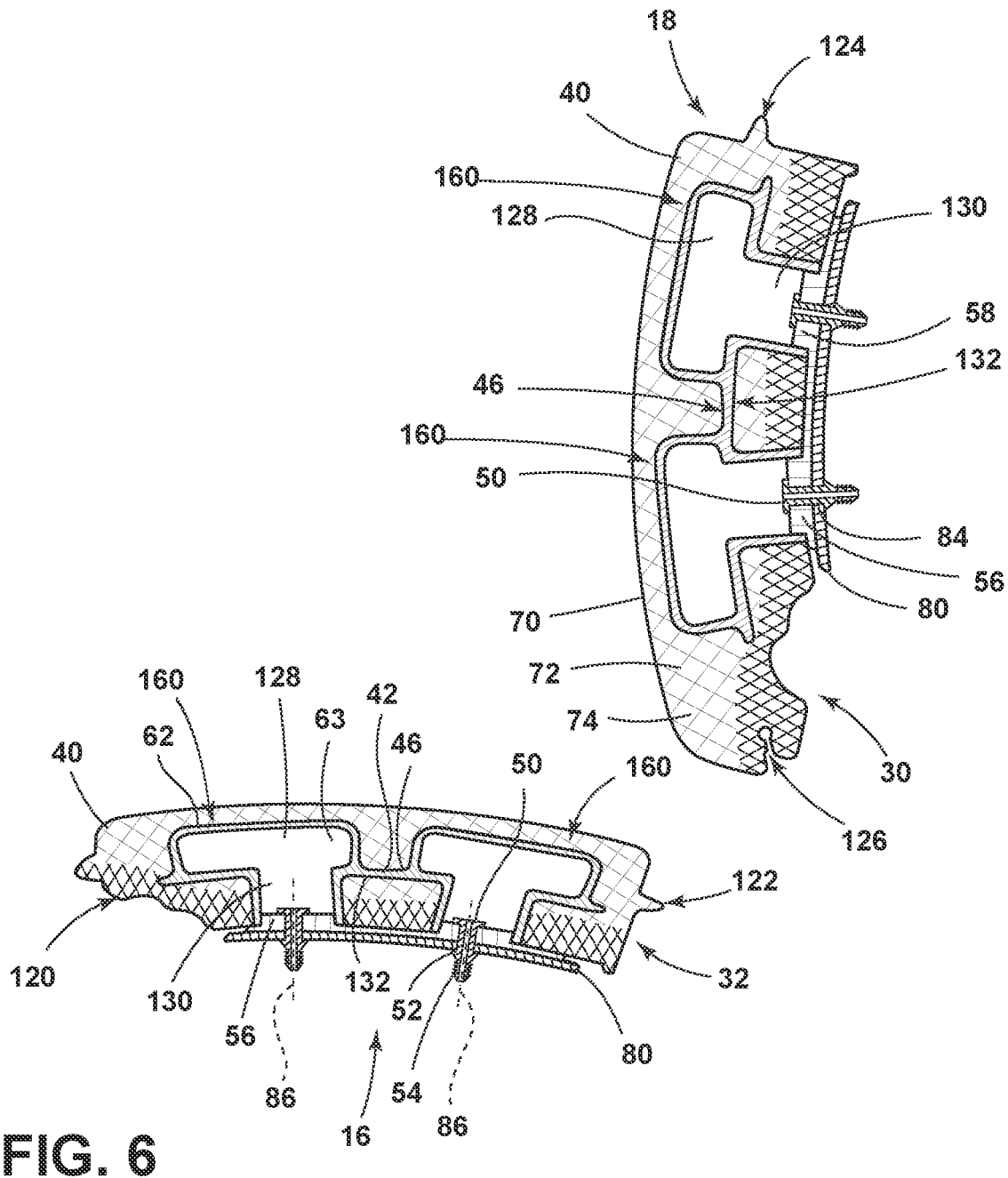
FIG. 6 is a cross-sectional view of the cushioned component removed from the seating assembly.

Referring now to FIG. 6, the lattice matrix 40 is defined by a pattern 70 of interconnected links 72 which define a set of cells 74. The cells 74 generally define voids within the lattice matrix 40 as defined in shape and size by the pattern 70 of interconnected links 72. The spaces or voids defined by the cells 74 of the lattice matrix 40 allow the lattice matrix 40 to deflect or deform under an applied pressure or force of a seated seat occupant. Thus, the interconnected links 72 are interconnected with one another, yet spaced-apart from one another to define the cells 74 into which the interconnected links 72 can deform or deflect into. In this way, the lattice matrix 40 is a deflectable lattice matrix.

As used herein, the term "deflectable" refers to a component that is considered cushioning, such that the component is compressible when under pressure from an applied force. The term "deflectable" is also used herein to describe a component part that is flexibly resilient. In this way, a deflectable component part is contemplated to a be a part that can be compressed from an at-rest condition to a compressed condition under a compression force, and is further contemplated to resiliently return to the at-rest condition from the compressed condition after the compression force is removed. Thus, a deflectable lattice matrix described herein acts as a cushioning component of a seat assembly that can support a seat occupant in a compressed condition and return to an at-rest condition when the seat occupant is removed from the seat assembly.

As further shown in FIG. 6, the cushioned component 32 of the seat portion 16 is contemplated to include a first profile 120 that allows the cushioned component 32 of the seat portion 16 to nest with adjacent cushioned components 32 within the seat portion 16. It is contemplated that the cushioned component 32 of the seat portion 16 includes a second profile 122 that allows the cushioned component 32 of the seat portion 16 to interface with the seat assembly 10. The cushioned component 30 of the seatback 18 is contemplated to include a first profile 124 that allows the cushioned component 30 of the seatback 18 to nest with adjacent cushioned components 30 within the seatback 18. It is contemplated that the cushioned component 30 of the seatback 18 includes a second profile 126 that allows the cushioned component 30 of the seatback 18 to interface with the seat assembly 10 or an adjacent cushioned component.

As further shown in FIG. 6, each air bladder 160 of a first and second air bladders 160 includes a distal portion 128 and a proximal portion 130 in fluid communication with the distal portion 128. The distal portion 128 is positioned on an outer surface 46 of the platform assembly 42. The proximal portion 130 is positioned on an inner surface 132 of the platform assembly 42. It is contemplated, as shown in FIG. 6, that the connection stem 50 outwardly extends from the proximal portion 130. It is contemplated that the support plate 56 seals each air bladder 160 of the first and second air bladders 160. It is contemplated that a cushioning effect of the air bladder assembly 60 is dependent upon the inflated or pressurized condition of the air bladder assembly 60, such that the air bladder assembly 60 provides more support while in a pressurized condition.

Figure 7:
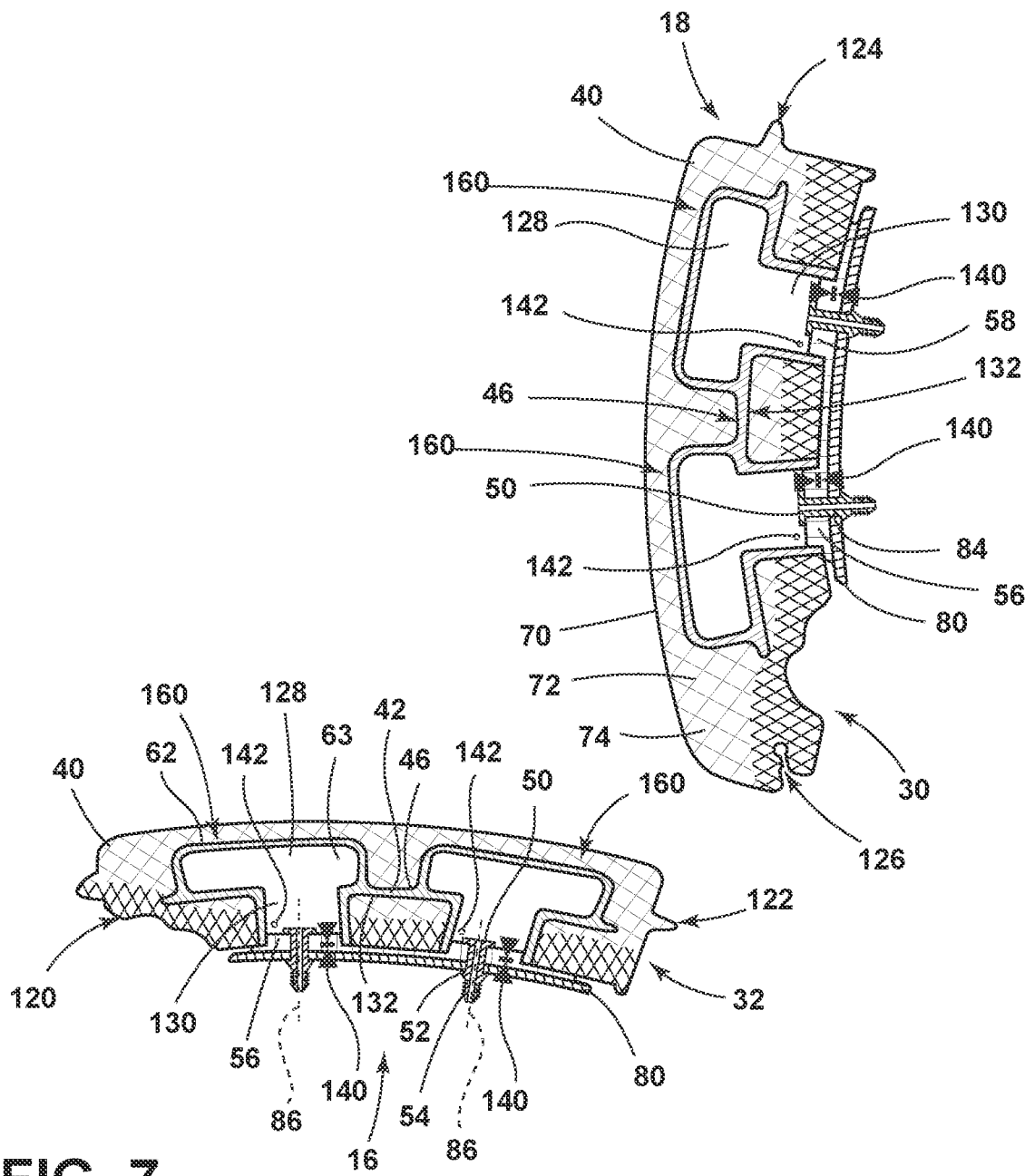
FIG. 7 is a cross-sectional view of a cushioned component removed from the seating assembly and having an air pressure release valve.

Referring now to FIG. 7, it is contemplated that each air bladder 160 includes an air pressure release valve 140. The air pressure release valve 140 is operable between an open condition and a closed condition. The open condition occurs while a pressure within the air bladder 160 is greater than a threshold pressure. It is contemplated that the threshold pressure is predetermined by at least one of a manufacturer and the occupant 90. The air pressure release valve 140 is operable in the closed condition while the pressure within the air bladder 160 is less than the threshold pressure. The air bladder 160 is contemplated to include a pressure sensor 142. The pressure sensor 142, upon sensing a pressure decrease due to the air pressure release valve 140 releasing air, is contemplated to signal the inflation module 48 to send air toward the air bladder 160 via the supply line 68. The pressure sensor 142 is contemplated to signal the inflation module 48 to stop sending air toward the air bladder 160 upon the pressure within the air bladder 160 reaching an intermediate pressure level determined by at least one of the manufacturer and the occupant 90.

According to various aspects of the present disclosure, a seat assembly 10, comprises a cushioned component 16 having a lattice matrix 40; an air bladder assembly 60 covered by the lattice matrix 40, wherein the air bladder assembly 60 includes a plurality of air bladders 160 supported on a platform assembly 42, wherein each air bladder 160 of the plurality of air bladders 160 includes a body portion 44 positioned on an outer surface 46 of the platform assembly 42 and operable between deflated and inflated conditions, and further wherein each air bladder 160 of the plurality of air bladders 160 includes a connection stem 50 outwardly extending from an inner surface 132 of the platform assembly 42; a support plate 56 having a plurality of access apertures 58 disposed therethrough, wherein the air bladder assembly 60 is operably coupled to the support plate 56, such that each air bladder 160 of the plurality of air bladders 160 is aligned with at least one access aperture 58 of the plurality of access apertures 58; and a carrier assembly 80 having a plurality of mounting apertures 84 disposed through an outer surface 82 thereof, wherein the connection stem 50 of each air bladder 160 is received through at least one mounting aperture 84 of the plurality of mounting apertures 84 of the carrier assembly 80.

Embodiments of the various aspects may include the outer surface 82 of the carrier assembly 80 being a contoured surface. Embodiments also include the support plate 56 being a flexibly resilient plate that includes a complementary configuration relative to the contoured surface of the carrier assembly 80. Embodiments also include the connection stem 50 of each air bladder 160 is received through at least one access aperture 58 of the plurality of access apertures 58 of the support plate 56. Embodiments also include each air bladder 160 of the plurality of air bladders 160 includes a non-porous outer casing 62 surrounding an interior cavity 63, further wherein the outer casing 62 and the lattice matrix 40 are integrated components comprised of a common material to define a monolithic structure.

According to various aspects of the present disclosure, a seat assembly 10 comprises a cushioned component 16 and a cushioned component 18 each having a lattice matrix 40; and an air bladder assembly 60 integrated into the lattice matrix 40, wherein the air bladder assembly 60 includes first and second air bladders 160 that are spaced-apart from one another and operable between at-rest and pressurized conditions, and further wherein the first and second air bladders 160 each include a non-porous outer casing 62 surrounding an interior cavity, wherein the outer casing 62 and the lattice matrix 40 are integrated components comprised of a common material to define a monolithic structure.

Embodiments of these aspects may include a support plate 56 having first and second access apertures 58 disposed therethrough, wherein the support plate 56 is flexibly resilient, and further wherein the first and second air bladders 160 are operably coupled to the support plate 56. Embodiments also include a carrier assembly 80 having first and second mounting apertures 84 disposed through an outer surface 82 thereof, wherein the outer surface 82 of the carrier assembly 80 is a contoured surface, and further wherein the support plate 56 includes a complementary configuration relative to the contoured surface of the outer surface 82 of the carrier assembly 80. Embodiments also include the air bladder assembly 60 having a platform assembly 42 having an outer surface 46, wherein the first and second air bladders 160 each include a body portion 44 positioned on the outer surface 46 of the platform assembly 42. Embodiments also include the first and second air bladders 160 including first and second connection stems 50, respectively, outwardly extending from an inner surface 132 of the platform assembly 42. Embodiments also include an inflation module 48 operably coupled to the first and second connection stems 50 of the first and second air bladders 160, such that the air bladder assembly 60 is fluidically coupled to the inflation module 48 by one or more supply lines 68. Embodiments also include the first and second connection stems 50 being received through the first and second access apertures 58 of the support plate 56. Embodiments also include the first and second connection stems 50 are received through the first and second mounting apertures 84 of the carrier assembly 80.

According to various aspects of the present disclosure, a seat assembly 10 comprises a cushioned component 16 and a cushioned component 18 each having a lattice matrix 40; an air bladder 160 having a distal portion 128 and a proximal portion 130 in fluid communication with the distal portion 128, wherein the proximal portion 130 includes a connection stem 50 outwardly extending therefrom, and further wherein an outermost surface of the distal portion 128 is covered by the lattice matrix 40, and further wherein the air bladder 160 is operable between at-rest and pressurized conditions; a support plate 56 having an access aperture 58 disposed therethrough, wherein the support plate 56 is flexibly resilient, and further wherein the air bladder 160 is operably coupled to the support plate 56, such that the connection stem 50 thereof is received through the access aperture 58; and a carrier assembly 80 having a mounting aperture 84 disposed through an outer surface 82 thereof, wherein the connection stem 50 is received through the mounting aperture 84, and further wherein the outer surface 82 of the carrier assembly 80 is a contoured surface, and further wherein the support plate 56 includes a complementary configuration relative to the contoured surface.

Embodiments include the air bladder 160 including a platform assembly 42 having inner 132 and outer surfaces 46, and further wherein the distal portion 128 of the air bladder 160 is positioned on the outer surface 46 of the platform assembly 42, and further wherein the proximal portion 130 of the air bladder 160 is positioned on the inner surface 128 of the platform assembly 42. Embodiments also include the air bladder 160 having a non-porous outer casing 62 surrounding an interior cavity 63. Embodiments also include the outer casing 62 and the lattice matrix 40 being integrated components comprised of a common material to define a monolithic structure. Embodiments also include the connection stem 50 including a snap linkage 52, and further wherein the snap linkage 52 retains the air bladder 160, the support plate 56, and the carrier assembly 80 in a position along an axial direction of the connection stem 50. Embodiments also include the support plate 56 is disposed between the air bladder 160 and the carrier assembly 80. Embodiments also include an inflation module 48 operably coupled to the connection stem 50 of the air bladder 160 by at least one supply line 68.

According to various aspects of the present disclosure, a seat assembly 10, comprises a cushioned component 16 and a cushioned component 18 each having a lattice matrix 40; an air bladder assembly 60 covered by the lattice matrix 40, wherein the air bladder assembly 60 includes a plurality of air bladders 160 supported on a platform assembly 42, wherein each air bladder of the plurality of air bladders 160 includes a body portion 44 positioned on an outer surface 46 of the platform assembly 42 and operable between deflated and inflated conditions, wherein each air bladder 160 of the plurality of air bladders 160 includes a connection stem 50 outwardly extending from an inner surface 132 of the platform assembly 42, and further wherein each air bladder 160 of the plurality of air bladders 160 includes a pressure release valve 140; a support plate 56 having a plurality of access apertures 58 disposed therethrough, wherein the air bladder assembly 60 is operably coupled to the support plate 56, such that each air bladder 160 of the plurality of air bladders 160 is aligned with at least one access aperture 58 of the plurality of access apertures 58; and a carrier assembly 80 having a mounting aperture 84 disposed through an outer surface 82 thereof, wherein the connection stem 50 is received through the mounting aperture 84. Embodiments include an air within at least one air bladders 160 of the plurality of air bladders 160 releases through the pressure release valve 140 upon reaching a threshold pressure within the at least one air bladder 160 of the plurality of air bladders 160. Embodiments also include each air bladder 160 of the plurality of air bladders 160 release air through the pressure release valve 140 until an internal pressure of the plurality of air bladders 160 is below a threshold pressure.

According to various aspects of the present disclosure, a seat assembly 10 comprises a cushioned component 16 and a cushioned component 18 each having a lattice matrix 40; and an air bladder assembly 60 integrated into the lattice matrix 40, wherein the air bladder assembly 60 includes first and second air bladders 160 that are spaced-apart from one another and operable between at-rest and pressurized conditions, and further wherein the first and second air bladders 160 each include a non-porous outer casing 62 surrounding an interior cavity 63, wherein the outer casing 62 and the lattice matrix 40 are integrated components comprised of a common material to define a monolithic structure, and further wherein the first and second air bladders 160 each include a valve 140. Embodiments include the valve 140 of each of the first and second air bladders 160 releases air from within the first and second air bladders 160 while pressures within the first and second air bladders 160 are more than threshold pressures. Embodiments also include the valve 140 being operable between at least two conditions: an open condition, wherein air is released from inside the first and second air bladders 160, and further wherein the valve 140 is in the open condition when a pressure level inside the first and second air bladders 160 exceeds a predetermined pressure level threshold; and; and a closed condition, wherein the valve 140 is in the closed condition when the pressure level inside the first and second air bladders 160 is less than the predetermined pressure level threshold. Embodiments also include the first and second air bladders 160 including a pressure sensor 142, wherein the pressure sensor 142 signals the inflation module 48 to send air to the first and second air bladders 160.

According to various aspects of the present disclosure, a seat assembly 10 comprises a cushioned component 16 and a cushioned component 18 each having a lattice matrix 40; an air bladder 160 having a distal portion 128 and a proximal portion 130 in fluid communication with the distal portion 128, wherein the proximal portion 130 includes a connection stem 50 outwardly extending therefrom, wherein the air bladder 160 includes an air release valve 140, and further wherein an outermost surface of the distal portion 128 is covered by the lattice matrix 40, and further wherein the air bladder 160 is operable between at-rest and pressurized conditions; a support plate 56 having an access aperture 58 disposed therethrough, wherein the support plate 56 is flexibly resilient, and further wherein the air bladder 160 is operably coupled to the support plate 56, such that the connection stem 50 thereof is received through the access aperture 58; and a carrier assembly 80 having a mounting aperture 84 disposed through an outer surface 82 thereof, wherein the connection stem 50 is received through the mounting aperture 84, and further wherein the outer surface 82 of the carrier assembly 80 is a contoured surface, and further wherein the support plate 56 includes a complementary configuration relative to the contoured surface. Embodiments include the air release valve 140 releases air from within the air bladder 160 while a pressure level within the air bladder 160 exceeds a threshold pressure level, and further wherein the air release valve 140 is in a closed condition when the pressure within the air bladder 160 is less than the threshold pressure level. Embodiments also include the air bladder 160 include a pressure sensor 142, pressure sensor 142 signals the inflation module 48 to send air to the air bladder 160 after the air release valve 140 releases air.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
    a cushioned component having a lattice matrix;
    an air bladder assembly covered by the lattice matrix, wherein the air bladder assembly includes a plurality of air bladders supported on a platform assembly, wherein each air bladder of the plurality of air bladders includes a body portion positioned on an outer surface of the platform assembly and operable between deflated and inflated conditions, wherein each air bladder of the plurality of air bladders includes a connection stem outwardly extending from an inner surface of the platform assembly, and further wherein each air bladder of the plurality of air bladders includes a pressure release valve in fluid communication with the body portion;
    a support plate having a plurality of access apertures disposed therethrough, wherein the air bladder assembly is operably coupled to the support plate, such that each air bladder of the plurality of air bladders is aligned with at least one access aperture of the plurality of access apertures; and
    a carrier assembly having a mounting aperture disposed through an outer surface thereof, wherein the connection stem is received through the mounting aperture.

2. The seat assembly of claim 1, wherein the outer surface of the carrier assembly is a contoured surface.

3. The seat assembly of claim 2, wherein the support plate is a flexibly resilient plate that includes a complementary configuration relative to the contoured surface of the carrier assembly.

4. The seat assembly of claim 1, wherein air within at least one air bladder of the plurality of air bladders releases through the pressure release valve upon reaching a threshold pressure within the at least one air bladder of the plurality of air bladders.

5. The seat assembly of claim 1, wherein each air bladder of the plurality of air bladders releases air through the pressure release valve until an internal pressure level of the plurality of air bladders is below a threshold pressure.

6. A seat assembly, comprising:
a cushioned component having a lattice matrix; and
an air bladder assembly integrated into the lattice matrix, wherein the air bladder assembly includes first and second air bladders that are spaced-apart from one another and operable between at-rest and pressurized conditions, and further wherein the first and second air bladders each include a non-porous outer casing surrounding an interior cavity, wherein the outer casing and the lattice matrix are integrated components comprised of a common material to define a monolithic structure, wherein the first and second air bladders each include a valve, and further wherein the valve of each of the first and second air bladders releases air from within the first and second air bladders while pressures within the first and second air bladders are more than threshold pressures.

7. The seat assembly of claim 6, including:
a support plate having an access aperture disposed therethrough, wherein the support plate is flexibly resilient, and further wherein the first and second air bladders are operably coupled to the support plate.

8. The seat assembly of claim 7, including:
a carrier assembly having a mounting aperture disposed through an outer surface thereof, wherein the outer surface of the carrier assembly is a contoured surface, and further wherein the support plate includes a complementary configuration relative to the contoured surface.

9. The seat assembly of claim 6, wherein each of the first and second air bladders includes a connection stem outwardly extending from an inner surface of a platform assembly.

10. The seat assembly of claim 9, including:
an inflation module operably coupled to the connection stem, such that the air bladder assembly is fluidically coupled to the inflation module by one or more supply lines.

11. The seat assembly of claim 10, wherein the valve is operable between at least two conditions:
an open condition, wherein air is released from inside the first and second air bladders, and further wherein the valve is in the open condition when a pressure level inside the first and second air bladders exceeds a predetermined pressure level threshold; and
a closed condition, wherein the valve is in the closed condition when the pressure level inside the first and second air bladders is less than the predetermined pressure level threshold.

12. The seat assembly of claim 11, wherein the first and second air bladders each include:
a pressure sensor, wherein the pressure sensor signals the inflation module to send air to the first and second air bladders.

13. A seat assembly, comprising:
a cushioned component having a lattice matrix;
an air bladder having a distal portion and a proximal portion in fluid communication with the distal portion, wherein the proximal portion includes a connection stem outwardly extending therefrom, wherein the air bladder includes a release valve, and further wherein an outermost surface of the distal portion is covered by the lattice matrix, and further wherein the air bladder is operable between at-rest and pressurized conditions;
a support plate having an access aperture disposed therethrough, wherein the support plate is flexibly resilient, and further wherein the air bladder is operably coupled to the support plate, such that the connection stem thereof is received through the access aperture; and
a carrier assembly having a mounting aperture disposed through an outer surface thereof, wherein the connection stem is received through the mounting aperture, and further wherein the outer surface of the carrier assembly is a contoured surface, and further wherein the support plate includes a complementary configuration relative to the contoured surface.

14. The seat assembly of claim 13, wherein the air bladder includes a platform assembly, and further wherein the distal portion of the air bladder is positioned on an outer surface of the platform assembly, and even further wherein the proximal portion is positioned on an inner surface of the platform assembly.

15. The seat assembly of claim 13, wherein the air bladder includes a non-porous outer casing surrounding an interior cavity.

16. The seat assembly of claim 13, wherein the release valve releases air from within the air bladder while a pressure level within the air bladder exceeds a threshold pressure level, and further wherein the release valve is in a closed condition when the pressure within the air bladder is less than the threshold pressure level.

17. The seat assembly of claim 16, including:
an inflation module operably coupled to the connection stem by at least one supply line.

18. The seat assembly of claim 13, wherein the support plate is disposed between the air bladder and the carrier assembly.

19. The seat assembly of claim 17, wherein the air bladder includes a pressure sensor, wherein the pressure sensor signals the inflation module to send air to the air bladder after the release valve releases air.

* * * * *